US010969937B2

(12) United States Patent
Schwarz et al.

(10) Patent No.: US 10,969,937 B2
(45) Date of Patent: Apr. 6, 2021

(54) CONTEXT-AWARE SYSTEM MENU BEHAVIOR FOR MIXED REALITY

(71) Applicant: MICROSOFT TECHNOLOGY LICENSING, LLC, Redmond, WA (US)

(72) Inventors: Julia Schwarz, Redmond, WA (US); Casey Leon Meekhof, Redmond, WA (US); Alon Farchy, Redmond, WA (US); Sheng Kai Tang, Redmond, WA (US); Nicholas F. Kamuda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/298,436

(22) Filed: Mar. 11, 2019

(65) Prior Publication Data

US 2020/0225813 A1 Jul. 16, 2020

Related U.S. Application Data

(60) Provisional application No. 62/791,251, filed on Jan. 11, 2019.

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/013* (2013.01); *G06F 3/017* (2013.01); *G06F 3/04845* (2013.01)

(58) Field of Classification Search
None
See application file for complete search history.

(56) References Cited

U.S. PATENT DOCUMENTS

| 2011/0214082 A1 | 9/2011 | Osterhout et al. |
| 2011/0227820 A1* | 9/2011 | Haddick .............. G02B 27/017 345/156 |

(Continued)

FOREIGN PATENT DOCUMENTS

EP 3279782 A1 2/2018

OTHER PUBLICATIONS

"Non Provisional Application Filed in U.S. Appl. No. 16/193,108", filed Nov. 16, 2018, 45 Pages.

(Continued)

*Primary Examiner* — William C Trapanese
(74) *Attorney, Agent, or Firm* — Workman Nydegger (57) ABSTRACT

Systems and methods are provided for controlling the position of an interactive movable menu in a mixed-reality environment. In some instances, a mixed-reality display device presents a mixed-reality environment to a user. The mixed-reality device then detects a first gesture associated with a user controller while presenting the mixed-reality environment and, in response to the first gesture, triggers a display of an interactive movable menu within the mixed-reality environment as a tethered hologram that is dynamically moved within the mixed-reality environment relative to and corresponding with movement of the user controller within the mixed-reality environment. Then, in response to a second detected gesture, the mixed-reality device selectively locks a display of the interactive movable menu at a fixed position that is not tethered to the user controller.

20 Claims, 8 Drawing Sheets

(51) Int. Cl.
    *G06F 3/01*         (2006.01)
    *G06F 3/0484*     (2013.01)

(56) References Cited

U.S. PATENT DOCUMENTS

| | | |
|---|---|---|
| 2013/0342572 A1 | 12/2013 | Poulos et al. |
| 2015/0317831 A1* | 11/2015 | Ebstyne ................ G06T 19/006 345/419 |
| 2016/0025981 A1 | 1/2016 | Burns et al. |
| 2016/0026242 A1 | 1/2016 | Burns et al. |
| 2016/0034039 A1 | 2/2016 | Maeda et al. |
| 2018/0075657 A1 | 3/2018 | Lanier et al. |
| 2018/0096507 A1 | 4/2018 | Valdivia et al. |

OTHER PUBLICATIONS

Azai, et al., "Tap-Tap Menu: Body Touching for Virtual Interactive Menus", In Proceedings of 24th ACM Symposium on Virtual Reality Software and Technology, Nov. 28, 2018, 2 Pages.

Dachselt, et al., "Three-dimensional menus: A survey and taxonomy", In Journal of Computers & Graphics, vol. 31, Jan. 1, 2007, pp. 53-65.

Datcu, et al., "Free-Hands Interaction in Augmented Reality", In Proceedings of 1st symposium on Spatial User Interaction, Jul. 20, 2013, pp. 33-40.

Kim, et al., "Multimodal Menu Presentation and Selection in Immersive Virtual Environments", In Proceedings IEEE Virtual Reality, Mar. 18, 2000, 8 Pages.

"International Search Report and Written Opinion Issued in PCT Application No. PCT/US19/067694", dated Apr. 21, 2020, 13 Pages.

\* cited by examiner

CONTEXT-AWARE SYSTEM MENU BEHAVIOR FOR MIXED REALITY

This application claims the benefit of and priority to U.S. Provisional Patent Application Ser. No. 62/791,251, filed on Jan. 11, 2019 and entitled "CONTEXT-AWARE SYSTEM MENU BEHAVIOR FOR MIXED-REALITY," which application is expressly incorporated herein by reference in its entirety.

BACKGROUND

"Augmented reality" typically refers to virtual experiences where virtual objects are visually placed within the real world, such that a user experiences virtual content and the real world simultaneously. In contrast, "virtual reality" typically refers to immersive virtual experiences where a user's view of the real-world is completely obscured and only virtual objects are perceived. Typically, "mixed-reality" refers to either augmented reality or virtual reality environments. However, for the sake of clarity and simplicity, the terms mixed-reality, virtual reality, and augmented reality are used interchangeably herein.

Mixed-reality systems are typically configured as head mounted displays that generate and/or render the mixed-reality content. Continued advances in hardware capabilities and rendering technologies have greatly increased the realism of virtual objects and scenes displayed to a user within mixed-reality environments. For example, virtual objects can be placed within a mixed-reality environment in such a way as to give the impression that the virtual object is part of the real world.

Some mixed-reality systems have been configured to track the movement of a user's body parts, such as the user's hands, as the user interacts with virtual objects in the mixed-reality environment. Furthermore, some mixed-reality systems are configured to replicate the user's body parts within the mixed-reality, such that the user is able to view and control virtualized body parts within the mixed-reality environment. For instance, a user's hand can be presented as a hologram occlusion that moves within the mixed-reality environment in direct response to the movements of their own real-world hand. As the user moves their real-world hand, the hand occlusion is also moved, such that it is capable of interacting with other virtual objects within the mixed-reality environment.

Many mixed-reality systems allow users to use their body parts (or tools or other controllers manipulated thereby) to interact with virtual objects in the mixed-reality environment. For instance, some mixed-reality systems allow a user to use their hands (or virtual representations thereof) to interact with virtual input receivers, such as virtual menus, in the mixed-reality environment. Such virtual menus may fulfill a variety of purposes, such as allowing users to select applications to execute in the mixed-reality environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include methods and systems for selectively controlling the positions and/or modes of interactive movable menus in mixed-reality environments.

In some instances, a mixed-reality system presents a mixed-reality environment, including one or more holograms, to a user. The mixed-reality system detects a first gesture associated with a user controller while presenting the mixed-reality environment and, in response to the first gesture, triggers a display of an interactive movable menu within the mixed-reality environment that is displayed as a tethered or leashed hologram that is displayed in a position relative to a user controller. In this regard, the term leashed and tethered should be viewed as interchangeable. The interactive movable menu is moved, within the mixed-reality environment, as a tethered/leashed hologram, dynamically in response to and corresponding with/relative to movement of the user controller within the mixed-reality environment.

In some embodiments, the mixed-reality system detects a second controller gesture and, in response to the second gesture, selectively locks a display of the interactive movable menu at a fixed position within the mixed-reality environment, that is not tethered to the user controller and such that the menu no longer moves within the mixed-reality environment as a tethered hologram that dynamically moves relative to and corresponding with movement of the user controller within the mixed-reality environment. With such an embodiment, a user's same hand (or other controller) can be used to trigger a display of a menu that moves with the user's hand/controller within a mixed-reality environment and then to lock the menu in a fixed position to receive input with the same user's hand/controller, which would not be possible if the menu continued to move with the user's hand.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

At least some embodiments herein relate to mixed-reality systems for controlling the position and/or mode of virtual menus presented in mixed-reality environments.

In some instances, the virtual menus are selectively locked/unlocked with regard to their relative positions within the mixed-reality environments and controllers in the mixed-reality environments.

As previously disclosed, many mixed-reality systems utilize menus that are presented to users within mixed-reality environments. These menus may be virtual holograms, for example, comprising application interfaces with input controls/elements corresponding to application functionality and which, when selected within a mixed reality environment, can trigger the corresponding application functionality within the mixed-reality environment.

Figure 1:
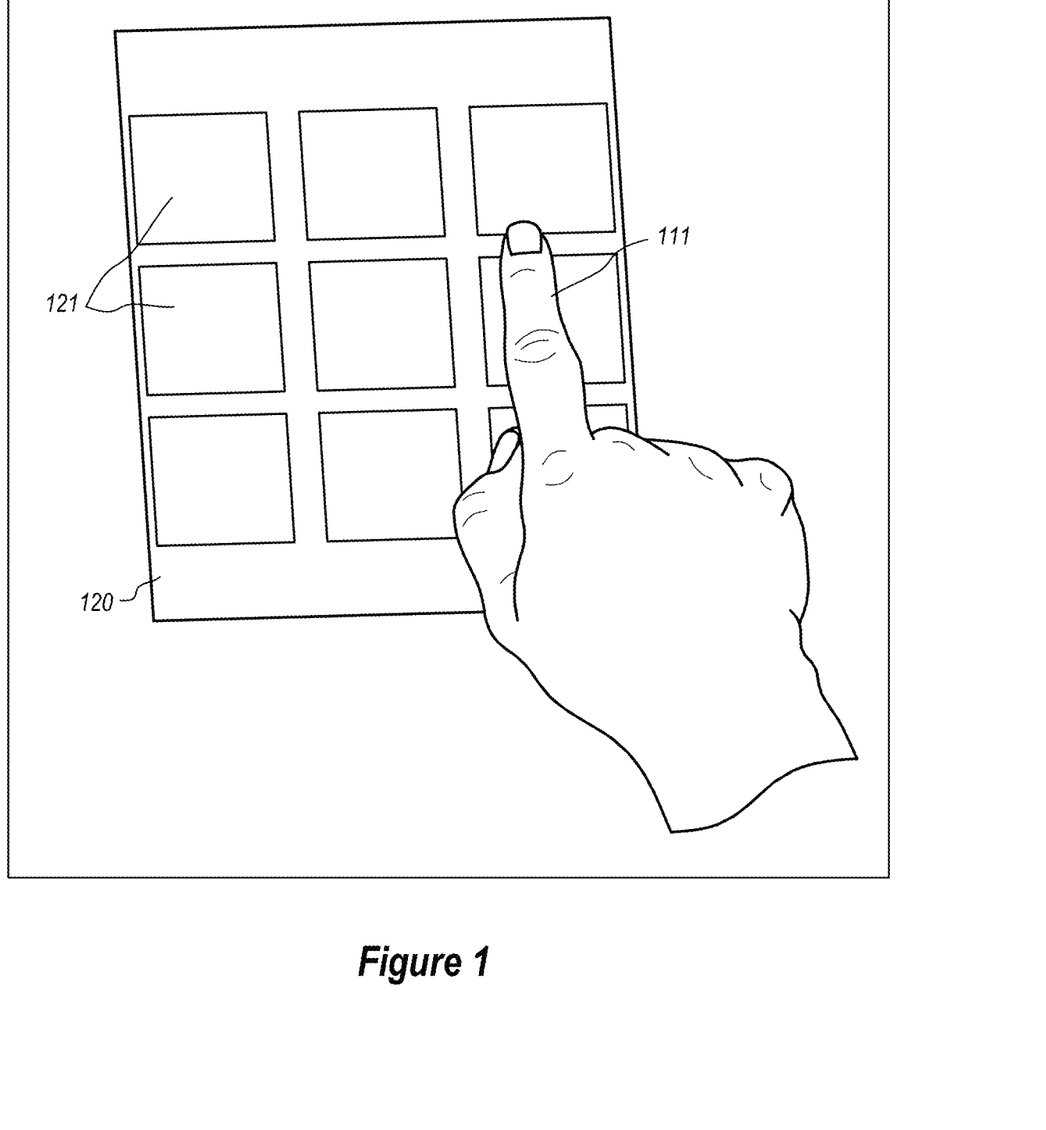
FIG. 1 illustrates an exemplary depiction of an interactive virtual system menu that can be displayed in a mixed-reality environment.

One example of such a menu is mixed-reality menu 120 depicted in FIG. 1. For example, a user interfaces with the mixed-reality menu 120 illustrated in FIG. 1 to enter user input by touching the selection tiles 121 of the menu 120 (which are presented as individual holograms and/or which are part of a unified menu hologram) with their finger 111, by positioning their finger 111 to intersect a display plane/location of the interactive objects displayed within the menu 120.

Mixed-reality systems may utilize menus, such as menu 120, for receiving user input in a variety of contexts, such as to allow a user to select an application to execute in a mixed-reality environment, or to receive user commands while the user navigates through interactive elements of a mixed-reality experience.

Because menus have a broad variety of uses in mixed-reality environments, different modes of displaying such menus in mixed-reality environments may be optimal in different contexts. For instance, if a mixed-reality menu will be closely associated with a relatively stationary virtual object, location, or application in the mixed-reality environment, it may be beneficial for the mixed-reality menu to be position locked to that virtual object or location, such that the menu does not follow the user as the user moves around in the mixed-reality environment.

In other instances, however, if a user wishes to utilize a menu while walking, running, or otherwise moving, it may be beneficial for the mixed-reality menu to be tethered to the user in some fashion (e.g., the user's hand, the user's body, or the user's gaze) such that the mixed-reality menu follows the user's motion within the mixed-reality environment to remain accessible to the user regardless of the user's position within the mixed-reality environment.

Similarly, in other instances, if a user needs to reference/utilize a menu while observing a mixed-reality environment, it is often beneficial for the mixed-reality menu to be tethered to the user's controller (such as the user's hand), rather than to a particular gaze location or to the user's body location, so that the user will have the ability to move the menu around in the user's field of view in order to be able to see any portion of the field of view freely. Unfortunately, when a menu is tethered to a user's hand, it may not be possible for the user to use that same hand to provide input into the menu. For instance, as the user moves a finger towards the menu, to select an option on the menu, the menu may move away from the user's finger. In such a situation, the user may be required to use another hand/controller to interact with the menu that is positionally locked to the first hand/controller. Requiring both hands for menu manipulation in this manner, however, is highly restrictive and can be undesirable.

This disclosure includes embodiments which may address some or all of the aforementioned challenges associated with controlling the position of an interactive movable menu in a mixed-reality environment by enabling a user to selectively lock and unlock relative positioning of the menu within the mixed-reality environment.

In some embodiments, a mixed-reality system detects a first gesture for triggering display of an interactive movable menu in a mixed-reality environment and displays the interactive movable menu as a hologram tethered to a user controller, and in response to detecting a second gesture, the mixed-reality system selectively locks a display of the interactive movable menu at a fixed position untethered to the user controller. After selectively locking the display of the interactive movable menu, in some embodiments, the mixed-reality system detects a third gesture adapted to trigger an interaction with the menu. In some implementations, the first, second, ad third gestures are all performed by a single controller (e.g., a user's hand).

Those skilled in the art will recognize that the embodiments disclosed herein may provide significant benefits over conventional systems and methods for controlling the position of an interactive movable menu in a mixed-reality environment. For example, some disclosed embodiments allow users to utilize a single controller to trigger the display of an interactive movable menu, manipulate its position, and enter user input therein. Such functionality provides users with the ability to fully interface with an interactive movable menu in a mixed-reality environment while ensuring that the users' second controller or hand may be used and/or available for other purposes while interfacing with the interactive movable menu.

Having just described some of the various high-level features and benefits of the disclosed embodiments, attention will now be directed to FIGS. 2 through 7. These figures illustrate various functionalities, examples, supporting illustrations, and methods related to selectively enabling control of movable menus in mixed-reality environments. Subsequently, attention will be directed to FIG. 8, which presents an example computer system that may be used to facilitate the disclosed principles.

The following embodiments are discussed in the context of a mixed-reality system (e.g., computer system 800 illustrated in FIG. 8) where a mixed-reality environment including one or more holograms is presented to a user at a mixed-reality display device and where the user may interact with one or more objects. One or more user-operated controls (e.g., a user's hands) for interacting with the mixed-reality environment may be tracked by the mixed-reality system (see FIG. 8 and the relevant discussion of sensors 820 and 830) such that the mixed-reality system detects movement, pose, and other characteristics of the user control. In response to detecting certain movement, poses, and/or other variables/values based on such movement and/or poses of the user control, the mixed-reality system may execute certain commands and/or input to shape the user experience.

In some instances, a user may wish to access the same menu (e.g., a "home" or "start" menu) in a variety of different contexts. For example, a user may desire to access a start menu while walking in a mixed-reality environment and/or while standing still within the mixed-reality environment. In another example, a user may desire to access a menu while they only have one hand or controller available to do so, or while they have no hands or controllers available to do so (e.g., while the user is performing an activity that requires the use of both hands such as climbing and/or while they are holding something in their other hand). In other instances, a user may desire that a menu be displayed at a fixed/selected location within a close proximity/distance to the user, such as when a user is performing a focused activity (e.g., building a model).

Figure 2:
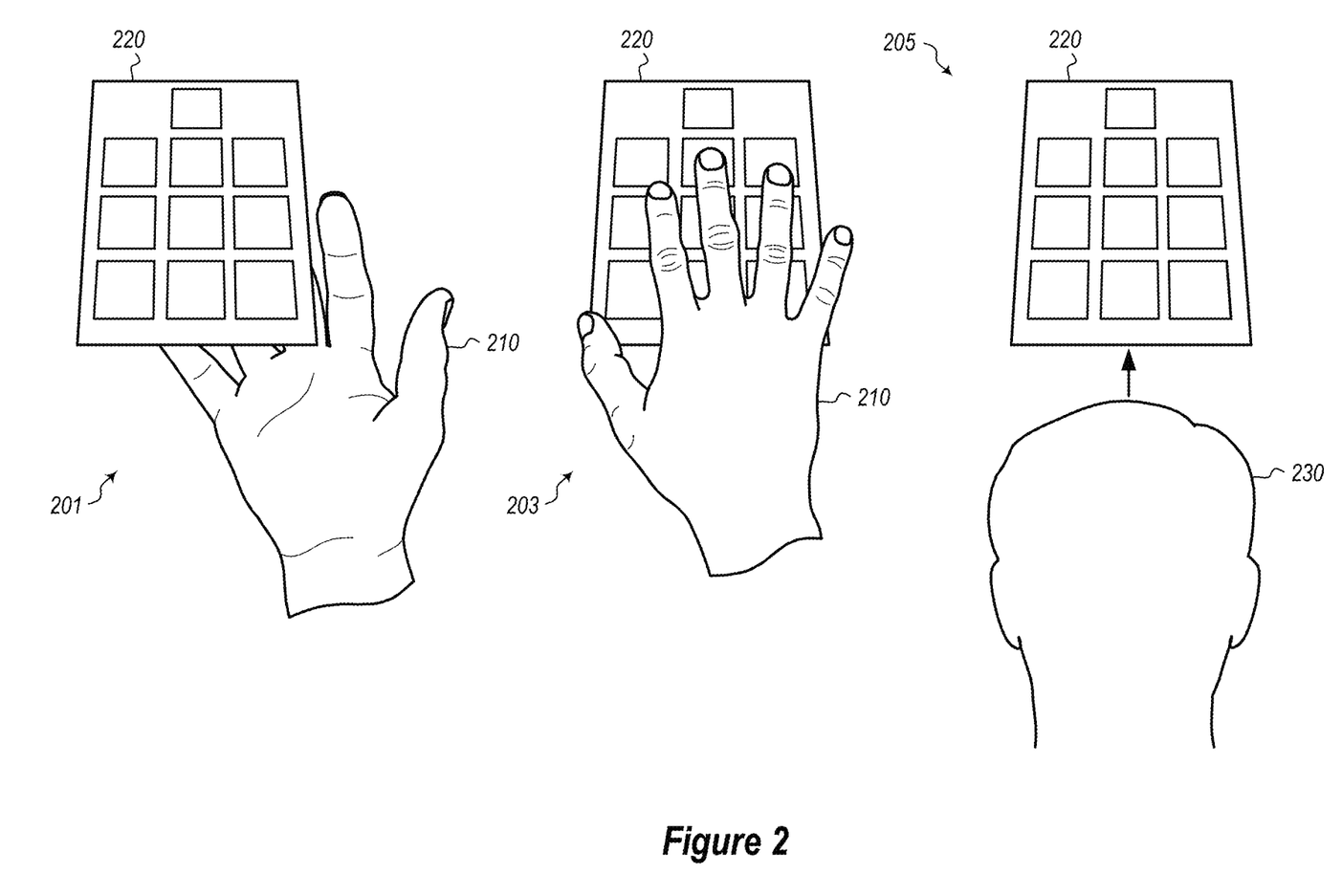
FIG. 2 illustrates an embodiment of a virtual menu presented in mixed-reality environments based on different contexts.

FIG. 2 illustrates several embodiments comprising mixed-reality environment scenes 201, 203, 205 in which a mixed-reality system generates/presents a menu 220 within a mixed-reality environment based on a context in which the menu 220 is invoked. The context may be, for example, the manner in which the display of the menu is triggered from different types of gestures/input that can be used for invoking the menu 220 in the mixed-reality environment.

Scene 201 of FIG. 2 demonstrates a mode of displaying a menu 220 where the menu 220 becomes tethered to the user's controller (embodied here as a hand 210) upon being generated. As such, the menu 220 functions as an interactive movable menu and is displayed as a tethered hologram that is dynamically moved within the mixed-reality environment relative to and corresponding with the movement of the user controller (e.g., hand 210) within the mixed-reality environment.

This mode of display is beneficial, in some instances, where the user wishes to access a menu while moving or while the ability to move the menu to prevent view obstruction is desired. This mode of display may be invoked in various ways. For example, a user may perform a gesture (such as quickly switching from a closed hand position to an open hand position), perform a predefined pose or sequence of poses (such as holding their hand with the palm up in an open position for a predetermined time period), and/or by entering some other input (e.g., controller button input, voice command, eye movement, etc.) while their controller is in a position for the menu to become tethered when invoked (e.g., when their hand is open with the palm up).

Scene 203 of FIG. 2 illustrates a mode of displaying a menu 220 where the menu 220 becomes locked in a fixed position relative to the mixed-reality environment (or some object therein), such that the menu 220 stays in the same position within the mixed-reality environment, regardless of movement of the user's body or the user's controller(s) (e.g., hand 210) within the mixed-reality environment. This mode of display is beneficial, in some instances, where a menu will be closely associated with a particular mixed-reality object and/or environment, such as when a user desires for the menu to be positioned locked near another related object within the mixed-reality object/environment and/or where users desire periodic access to a menu throughout an activity that occupies the user's body in a particular location (e.g., exercise activity, model building with two hands, etc.).

Scene 205 of FIG. 2 demonstrates a mode of displaying a menu 220 where the menu 220 becomes locked with respect to a body position of a user 230 in the mixed-reality environment, such the menu 220 stays in a fixed position with respect to the body position of the user 230. This mode of display is beneficial, for example, when a user 230 desires to access a menu in a way that does not always impede the user's field of view, and that may be turned away from when not needed and toward again when needed (e.g., where a user is making a work of art in a mixed-reality environment and wishes to access different artistry tools from an adjacent menu with a single hand and that can be turned away from to focus on the work of art).

Scene 205 of FIG. 2 also demonstrates a mode of displaying a menu 220 where the menu 220 can become locked in a fixed position relative to a gaze of a user 230 in the mixed-reality environment, such that the interactive movable menu 220 stays in the fixed position relative to the gaze of the user 230. Accordingly, as the user gaze moves, the interactive movable menu 220 moves along with the gaze in order to stay in the same position with respect to the user's gaze. This mode of display is beneficial, for example, when a user will require frequent access to a menu, and the benefit of frequent access outweighs the field of view that is occupied by the menu.

The modes of display associated scenes 203 and 205 of FIG. 2 may, similarly, be invoked in a manner of ways. In some instances, these modes of display are invoked by a user performing a particular gesture (such as waving, moving and/or positioning the hand in a particular manner) or by a user performing a predefined pose or sequence of poses (such as holding a particular hand position for a predetermined time period). In other instances, these modes of display are invoked by a user entering controller button input, issuing a voice command, or performing particular eye movement.

Different combinations of one or more gestures, commands, poses and other inputs can be associated with the different menu modes. Such that a first set of one or more gestures, commands, poses and other inputs can be associated with the mode shown in scene 201, a second set of one or more gestures, commands, poses and other inputs (different than the first set) can be associated with the mode shown in scene 203, and a third set of one or more gestures, commands, poses and other inputs (different than the first and/or second sets) can be associated with the mode shown in scene 203 different menu mode. The mappings/associations between the different menu modes and sets of control gestures, commands, poses and other inputs are stored within the storage devices of the mixed-reality system and/or are accessible by the mixed-reality system from one or more remote storage devices.

Those skilled in the art will recognize that the modes of display discussed above may be invoked after the menu is launched within the mixed-reality environment and/or prior to launching the menu within the mixed-reality environment.

It will furthermore be appreciated that the modes of display illustrated in FIG. 2 are, in some instances, sequenced. For example, after a user invokes an interactive movable menu 220 displayed as a hologram that is tethered to the user's hand 210, the user then performs a subsequent gesture, pose, sequence of poses, or other input to lock the display of the interactive movable menu 220 to a fixed position with respect to the user's gaze, hand or other portion of the user's body (as in scene 205), or the mixed-reality environment (or an object therein, as in scene 203). Continuing with this example, if the user had performed a command to lock the display of the menu 220 to the user's gaze, the user may then perform a subsequent gesture, pose, sequence of poses, or other input to lock the display of the menu to the user's body location or to a fixed position relative to the mixed-reality environment.

These embodiments, in some implementations, provide users with great control over how menus are displayed in mixed-reality, providing them with methods for interacting with menus that may be tailored to diverse mixed-reality experiences. Thus, the mixed-reality system embodiments illustrated in FIG. 2 allow users to access a mixed-reality menu in a manner that is based on the context/controls used for invoking and/or interacting with the menu and which may improve the accessibility and use of menus in mixed-reality.

FIGS. 3-6 further discuss embodiments in which the modes of display may be sequenced together to provide users with mechanisms for controlling the position of an interactive movable menu in a mixed-reality environment. In particular, FIGS. 3-6 discuss embodiments wherein a user utilizes their hand as a controller to perform a first gesture to trigger the display of an interactive movable menu within the mixed-reality environment, wherein the interactive movable menu is displayed as a hologram that is tethered to the user's hand. While FIGS. 3-6 are discussed with reference to particular hand gestures, positions, poses, etc., those skilled in the art will recognize that these elements are non-limiting and illustrative only, and that other hand gestures, positions, poses, etc., are within the scope of this disclosure.

Figure 3:
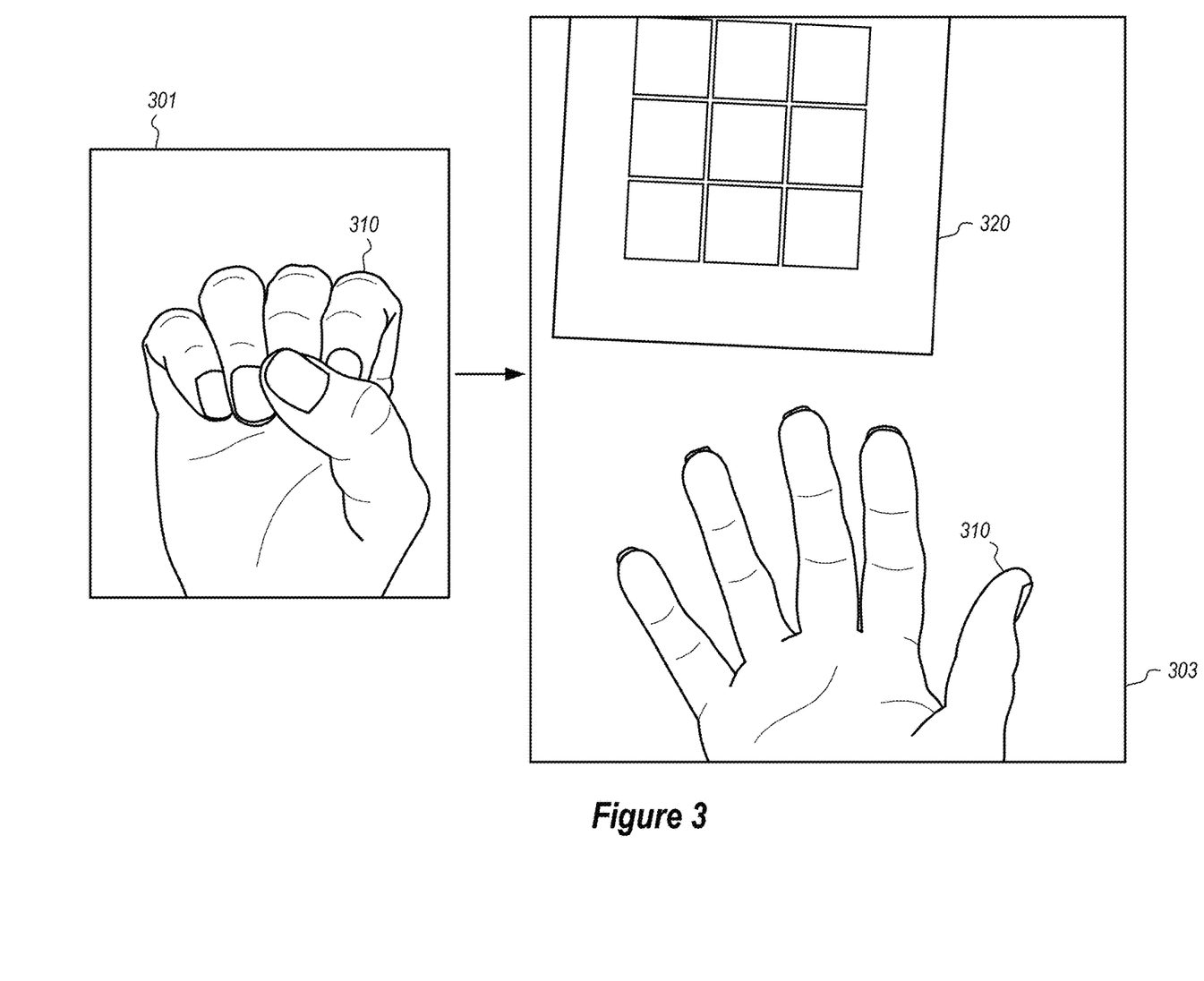
FIG. 3 illustrates an embodiment in a mixed-reality environment in which a user gesture triggers a display of an interactive movable menu in the mixed-reality environment.
Figure 4:
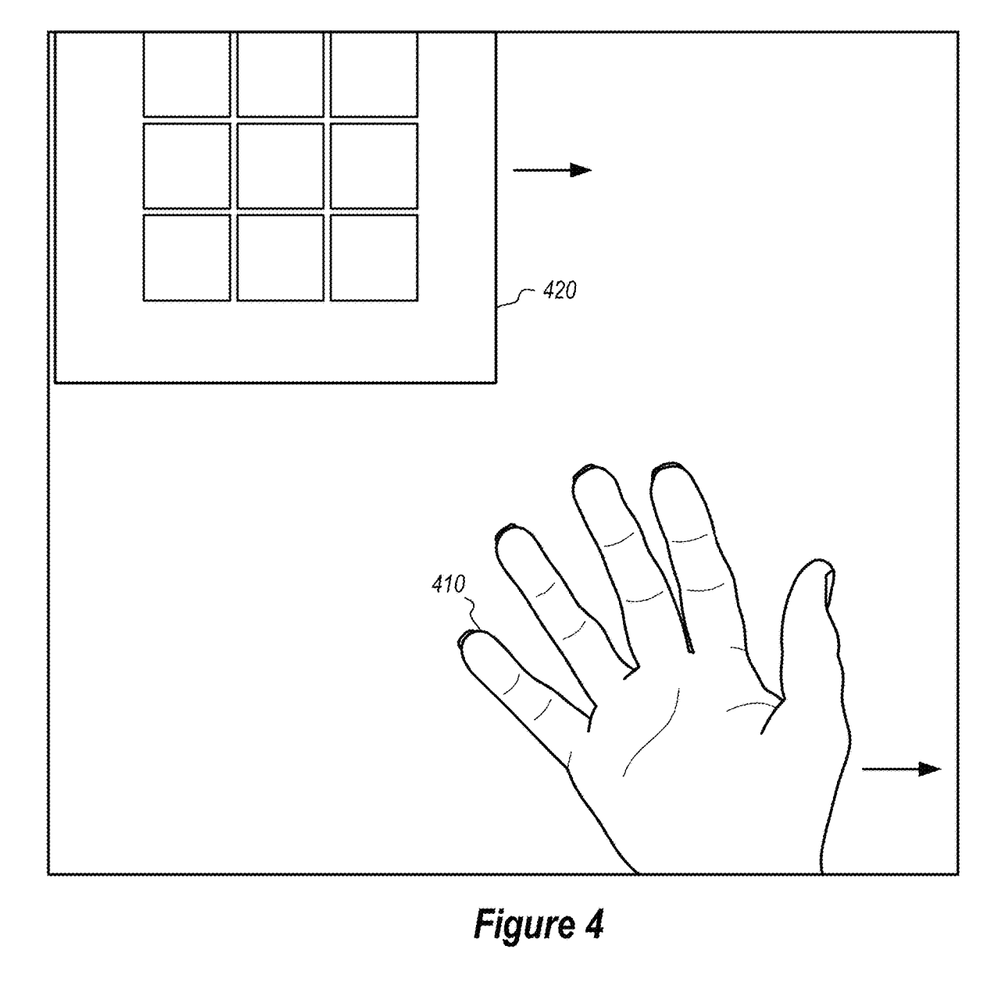
FIG. 4 illustrates an embodiment in which a mixed-reality system displays an interactive movable menu within a mixed-reality environment as a tethered hologram.

FIG. 3 illustrates an embodiment in which a mixed-reality system detects a user gesture to trigger a display of an interactive movable menu 320 in a mixed-reality environment. The arrow between the pose 301 and pose 303 of FIG. 3 is intended to suggest a transitional relationship between the two poses, in particular that the user changes their hand position from the pose 301 to pose 303. Thus, the user's hand 310 begins in a closed position (pose 301) and transitions to an open position (pose 303). The mixed-reality system is configured to detect this gesture/pose sequence as input for triggering the display of an interactive movable menu 320. Accordingly, upon detecting the gesture, and as can be seen above pose 303 in FIG. 3, the mixed-reality system displays the interactive movable menu 320 as a tethered hologram. As can be seen in FIG. 4, the tethered hologram of the interactive movable menu 420 is dynamically moved within the mixed-reality environment relative to and corresponding with the movements of the user's hand 410 within the mixed-reality environment. In FIG. 4, as denoted by the arrows extending from the user's hand 410 and the interactive movable menu 420, the user's hand 410 is moving to the user's right, and the interactive movable menu 420 hologram is following the user's hand 410.

Furthermore, those skilled in the art will be appreciate that other constraints (e.g., time, motion characteristics) may be placed on a triggering gesture or sequence of poses to help ensure that the interactive movable menu is only selectively enabled/triggered when the user desires the enablement thereof (or that the interactive movable menu does not become triggered at an inconvenient or distracting time). For example, returning to the embodiment shown in FIG. 3, a mixed-reality system may be configured to only selectively enable or display an interactive movable menu 320 if the pose sequence depicted (transitioning from a closed-hand pose 301 to an upward-facing open-hand pose 303) is performed within a predefined time interval. In another example, if the user performs the pose sequence depicted in FIG. 3, while the user's hand 310 is being moved laterally (with enough velocity, determined by a velocity threshold being exceeded), the mixed-reality system will refrain from displaying or enabling the interactive movable menu 320.

Figure 5:
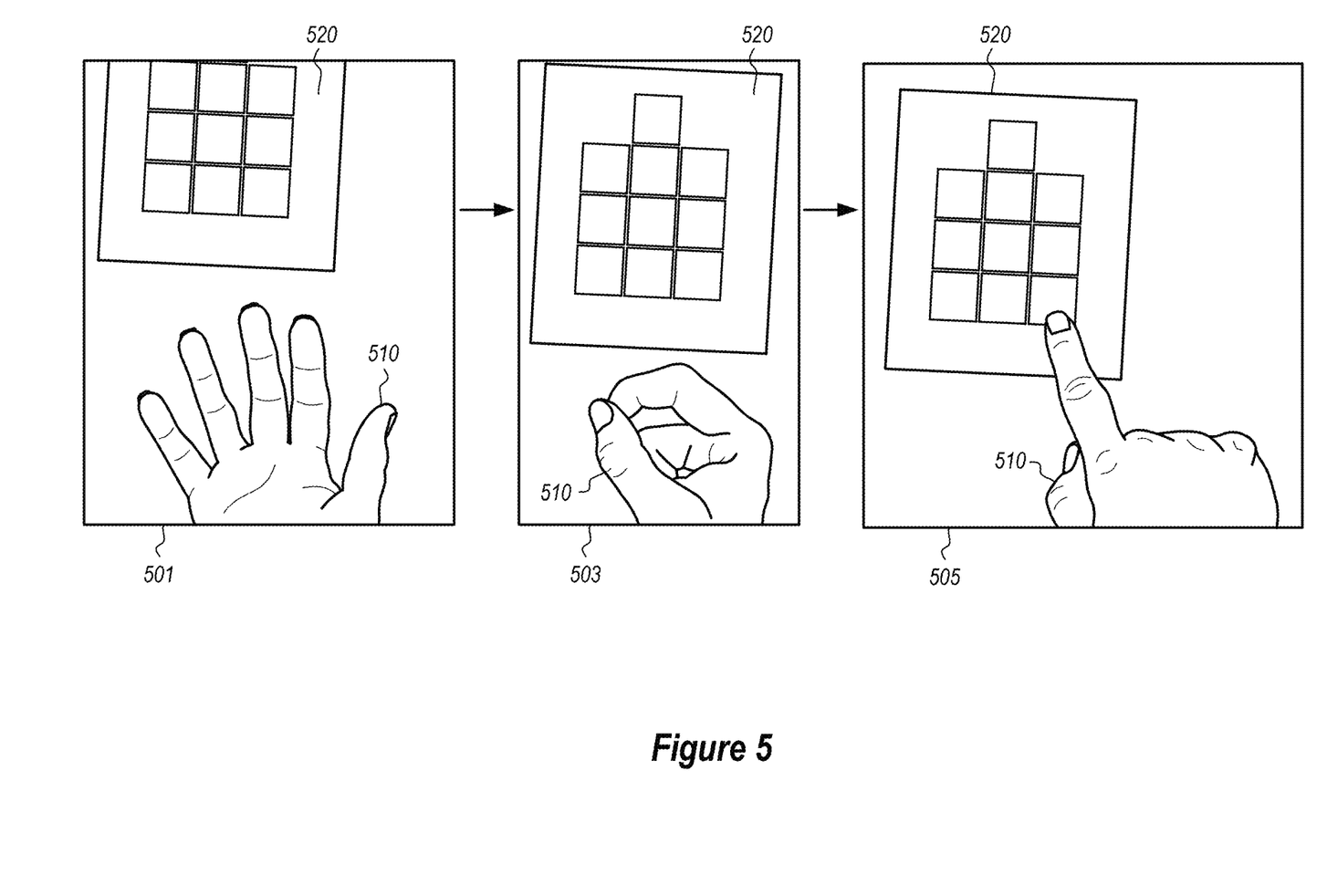
FIG. 5 illustrates an embodiment in which a mixed-reality system detects a gesture adapted to selectively lock a display of an interactive movable menu at a fixed position within a mixed-reality environment.

FIG. 5 illustrates an embodiment in which a mixed-reality system detects a gesture adapted to selectively lock a display of an interactive movable menu 520 at a fixed position. Pose 501 of FIG. 5 illustrates the user's hand 510 in an upward-facing open position for manipulating the position of the interactive movable menu 520, as described above in reference to FIG. 4. Pose 503 of FIG. 5 illustrates the user rotating their hand position from the upward-facing open position of pose 501 of FIG. 5 to the forward-facing pointing position of pose 505 of FIG. 5.

The mixed-reality system is configured to detect this gesture/pose (e.g., a change from the initial upward-facing open position) as input for selectively locking the display of the interactive movable menu 520 at a fixed position that is not tethered to the user's hand 510. As such, upon detecting the user's hand rotation, the mixed-reality system selectively locks the display of the interactive movable menu 520 to a fixed position such that the user can then use their hand 510 to interact with the interactive movable menu 520 at its fixed position to provide user input to the mixed-reality system through the menu 520. Thus, in some embodiments, the mixed-reality system locks the display of the interactive movable menu 520 in response to detecting a second controller gesture (i.e., after the first controller which triggered the initial display of the interactive movable menu), which is at least partially performed with the user controller (e.g., the user's hand).

Those skilled in the art will appreciate that the fixed position to which the interactive movable menu becomes locked as described in FIG. 5 may be relative to the location any part of the user's body, the user's gaze, or any location within the mixed-reality environment, as described hereinabove in reference to FIG. 2.

Whether or not the user interacted with the interactive movable menu after the mixed-reality system locked the display of the interactive movable menu in a fixed position, the mixed-reality system is, in some embodiments, configured to detect a subsequent gesture adapted to selectively unlock the display of the interactive movable menu from the fixed position, such that the interactive movable menu is again displayed as a tethered hologram that is dynamically moved within the mixed-reality environment relative to and corresponding with the movement of the user controller within the mixed-reality environment.

Figure 6:
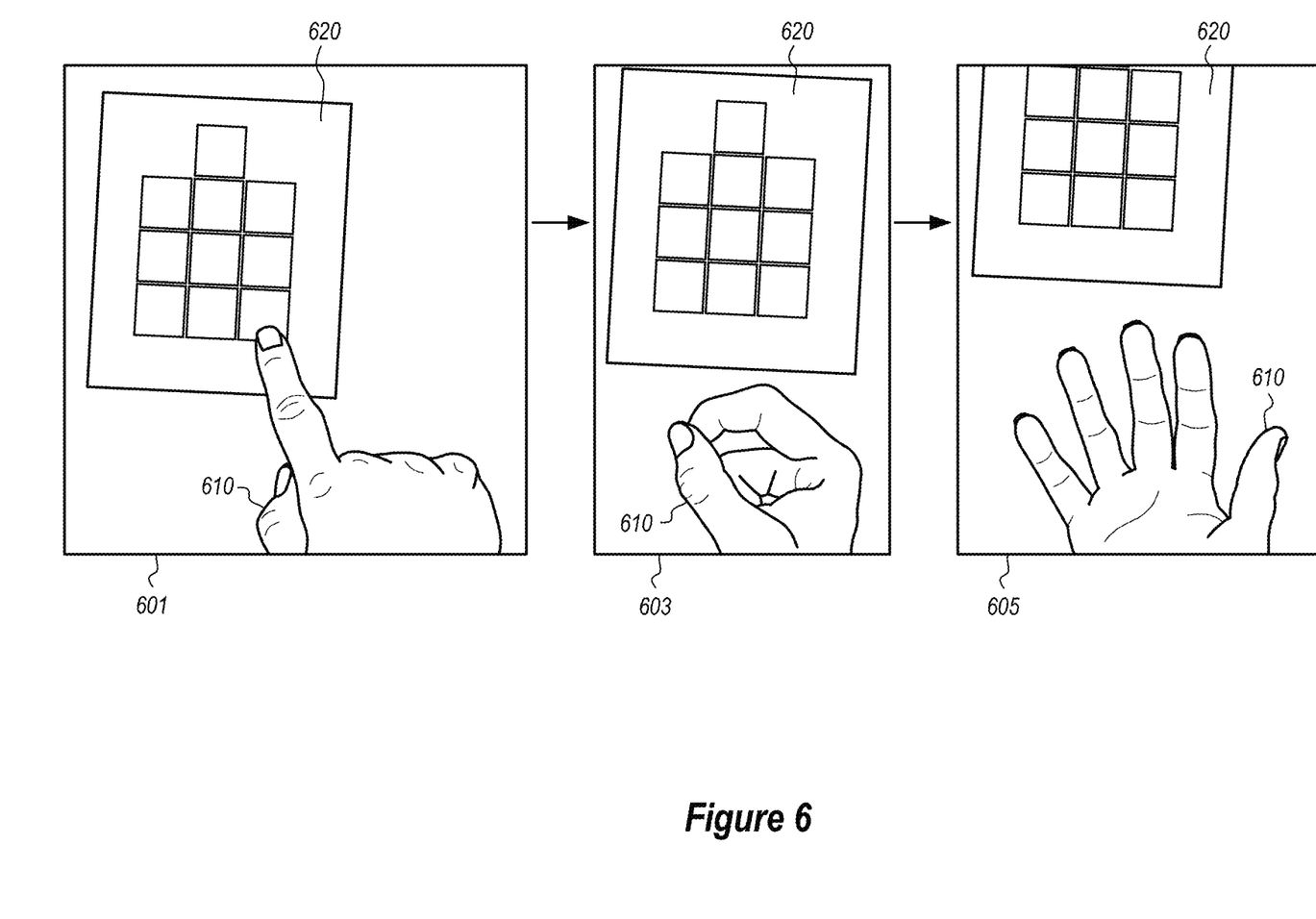
FIG. 6 illustrates an embodiment in which a mixed-reality system detects a gesture adapted to selectively unlock the display of an interactive movable menu from a fixed position within a mixed-reality environment.

FIG. 6 illustrates an example of this functionality. Pose 601 of FIG. 6 shows the user's hand 610 in a state of interaction with the interactive movable menu 620. Pose 603 of FIG. 6 shows the user's hand 610 transitioning from the state of interaction into a position wherein the user's hand 610 is facing upward in an open-hand pose (as shown in pose 605 of FIG. 6). The mixed-reality system is configured to detect the user's hand 610 in the upward-facing open-hand pose as input for selectively unlocking the display of the interactive movable menu 620. Therefore, upon detecting the triggering gesture/pose, the mixed-reality system re-tethers the display of the interactive movable menu to the user's hand, as is illustrated at pose 605 of FIG. 6.

It will be appreciated that constraints additional to those described may be placed on the gesture input for unlocking the display of the interactive movable menu. For example, in some embodiments, the mixed-reality system requires that the user's hand be detected in the upward-facing open-hand pose within a certain proximity to a part of the interactive movable menu before selectively unlocking the display of the interactive movable menu. In other embodiments, the mixed-reality system allows the user to perform the upward-facing open-hand pose (or another predefined pose) at any location, and the mixed-reality system will unlock the display of the interactive movable menu and reposition the interactive movable menu over the user's hand.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
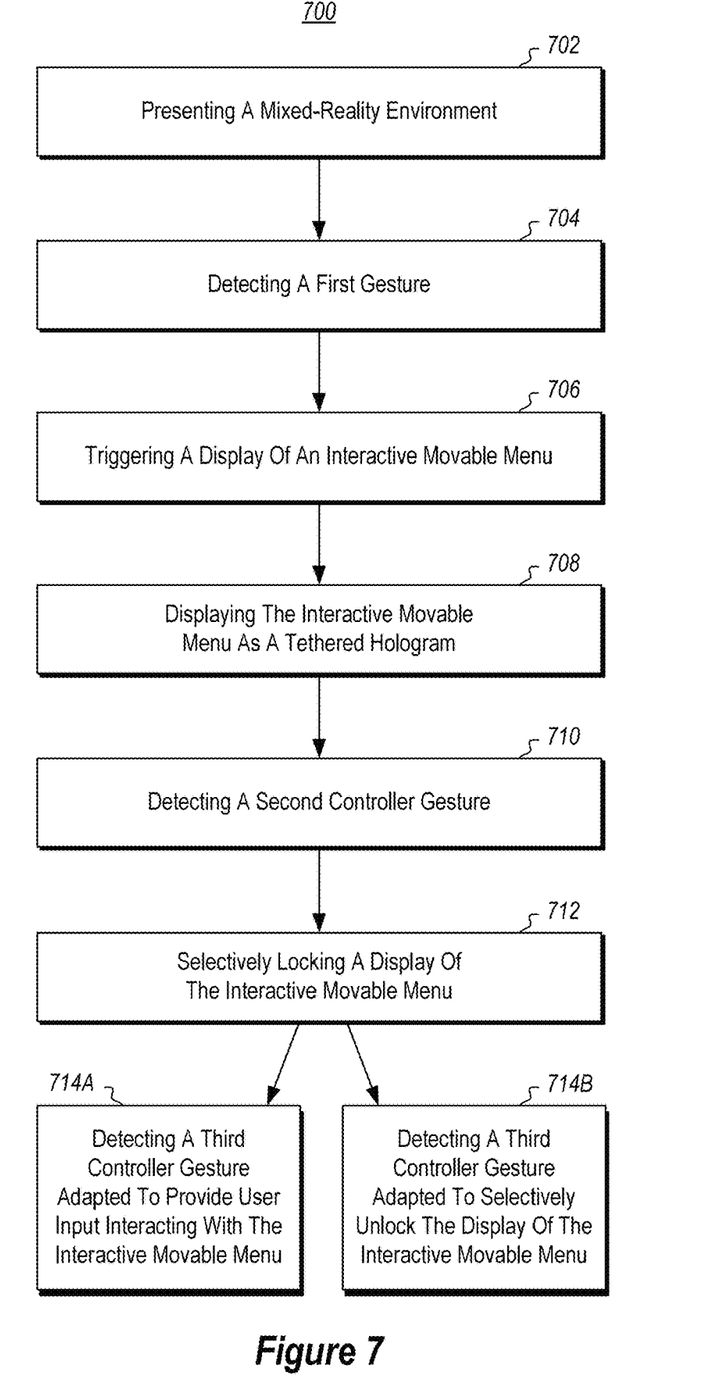
FIG. 7 illustrates an exemplary flow diagram associated with disclosed methods for controlling the position of an interactive movable menu in a mixed-reality environment.

FIG. 7 illustrates an exemplary flow diagram depicting a method for controlling the position of an interactive movable menu in a mixed-reality environment. Method 700 includes acts for presenting a mixed-reality environment (702), detecting a first gesture (704), triggering a display of an interactive movable menu (706), displaying the interactive movable menu as a tethered hologram (708), detecting a second controller gesture (710), selectively locking a display of the interactive movable menu (712), detecting a third controller gesture adapted to provide user input interacting with the interactive movable menu (714A), and detecting a third controller gesture adapted to selectively unlock the display of the interactive movable menu (714B).

Act 702 of method 700 includes presenting a mixed-reality environment. In some embodiments, this includes presenting one or more holograms which a user in the mixed-reality environment may interact with.

Act 704 of method 700 includes detecting a first gesture. In some embodiments the first gesture includes a predefined pose, sequence of poses or gestures, or other movement that meets predefined conditions (e.g., conditions of timing, velocity, etc.), or even voice or other commands (e.g., eye movement). In some instances, the gesture may also include or be replaced by a voice command that triggers the same functionality as the gesture.

Act 706 of method 700 includes triggering a display of an interactive movable menu. In some embodiments, the interactive movable menu includes elements for receiving user input and/or selections, such as selectable tiles and/or buttons which the user may interface with using a controller (e.g., the user's hand).

Act 708 of method 700 includes displaying the interactive movable menu as a tethered hologram. In some embodiments, (e.g., as seen in FIG. 4 hereinabove), the tethered hologram is dynamically moved within the mixed-reality environment relative to and corresponding with the movements of the user's controller (e.g., the user's hand) within the mixed-reality environment. For example, if the user moves their hand toward the user's left, the interactive movable menu will follow to maintain its position relative to the user's hand.

Act 710 of method 700 includes detecting a second gesture (which may be a second controller gesture or another gesture). The second gesture may be the same as, related to, partially different than, or entirely different from the first gesture. In some embodiments, the second controller gesture includes rotation of an orientation of the user controller to exceed a predetermined threshold of rotation (e.g., rotating the user's hand from an upward-facing open pose by a predefined amount of rotation towards a downward-facing open pose). The menu may remain in a relative horizontal and vertical position within the mixed-reality environment while the hand is rotated, such that it only has a fixed-relative position to the user's general horizontal and vertical hand/controller position. In other embodiments, the menu may also rotate with the hand/controller.

In some embodiments, a pinch gesture or another gesture may trigger locking of the menu in a particular position relative to the mixed-reality environment rather than the user's hand/controller. In some instances, the second gesture may also include or be replaced by a voice command that triggers the same functionality as the second gesture.

Act 712 of method 700 includes selectively locking a display of the interactive movable menu. In some embodiments, selectively locking the display of the interactive movable menu includes displaying the interactive movable menu in a fixed position that is not tethered to the user controller, such that the interactive movable menu no longer moves within the mixed-reality environment as a tethered hologram that dynamically moves relative to and corresponding with the movement of the user controller within the mixed-reality environment.

In some embodiments, the interactive movable menu becomes locked with respect to a body position of the user (or a portion of the user's body, separate from the user's hand or controller that invoked the gesture to instantiate the display of the menu), such that the interactive movable menu stays in the fixed position with respect to the body position of the user. This embodiment can be useful for enabling the user to move their body and the menu (with the body) as the user walks around an environment, but the user's hand that invoked the menu will be usable to enter input at the menu without moving the menu relative to the hand movements.

In other embodiments, the fixed position is fixed relative to the gaze of the user, such that the interactive movable menu stays in the fixed position relative to the gaze of the user (i.e., as the user gaze moves, so does the interactive movable menu).

In yet other embodiments, the fixed position is fixed relative to the mixed-reality environment (or any object therein), such that the interactive movable menu stays in the same position within the mixed-reality environment irrespective of movement of the user's body, the user's controller, or the user's gaze within the mixed-reality environment.

After the interactive movable menu is in a locked position, according to the steps above, the mixed-reality system detects, in some embodiments, additional user gestures to determine whether the user will provide user input at the interactive movable menu or return the interactive movable menu to a tethered state. Accordingly, act 714A of method 700 includes detecting a third gesture (which may be a controller gesture) adapted to provide user input interacting with the interactive movable menu. In some instances, the third gesture is different than both the first and second gesture. In other embodiments, the third gesture is the same as the first gesture.

In some instances, the third gesture may also include or be replaced by a voice command that triggers the same functionality as the third gesture. In some instances, the first gesture, the second gesture and the third gesture are received from a same gesture input component/controller (e.g., hand, hand-held controller, voice and/or other input component). In other instances, the gestures are received from different gesture input components.

Furthermore, act 714B of method 700 includes detecting a third controller gesture adapted to selectively unlock the display of the interactive movable menu. In some embodiments, the mixed-reality system selectively unlocks the display of the interactive movable menu from the fixed position, such that the interactive movable menu is again displayed as a tethered hologram that is dynamically moved within the mixed-reality environment relative to and corresponding with the movement of the user controller (e.g., the user's hand) within the mixed-reality environment.

Those skilled in the art will appreciate that constraints may be placed on the third controller gesture input for unlocking the display of the interactive movable menu. For example, in some embodiments, the mixed-reality system requires that the user's controller or hand be detected in an upward-facing open-hand pose within a certain proximity to a part of the interactive movable menu before selectively unlocking the display of the interactive movable menu. In other embodiments, the mixed-reality system allows the user to perform the upward-facing open-hand pose (or another predefined pose) at any location, and the mixed-reality system will unlock the display of the interactive movable menu and reposition the interactive movable menu over the user's hand.

Those skilled in the art will recognize that each of the gestures described hereinabove with reference to Method 700 illustrated by the flow diagram of FIG. 7 may, in some embodiments, be performed by a single user controller, such as a user's hand.

The disclosed embodiments, in some instances, provide various advantages over conventional systems and methods for controlling the position of an interactive movable menu in a mixed-reality environment. Some of these advantages include allowing users to utilize a single controller (e.g., one hand) to trigger the display of an interactive movable menu, manipulate its position, and enter user input therein. This functionality allows users the ability to fully interface with an interactive movable menu in a mixed-reality environment while ensuring that the users' second controller or hand may be used and/or available for other purposes while interfacing with the interactive movable menu.

Figure 8:
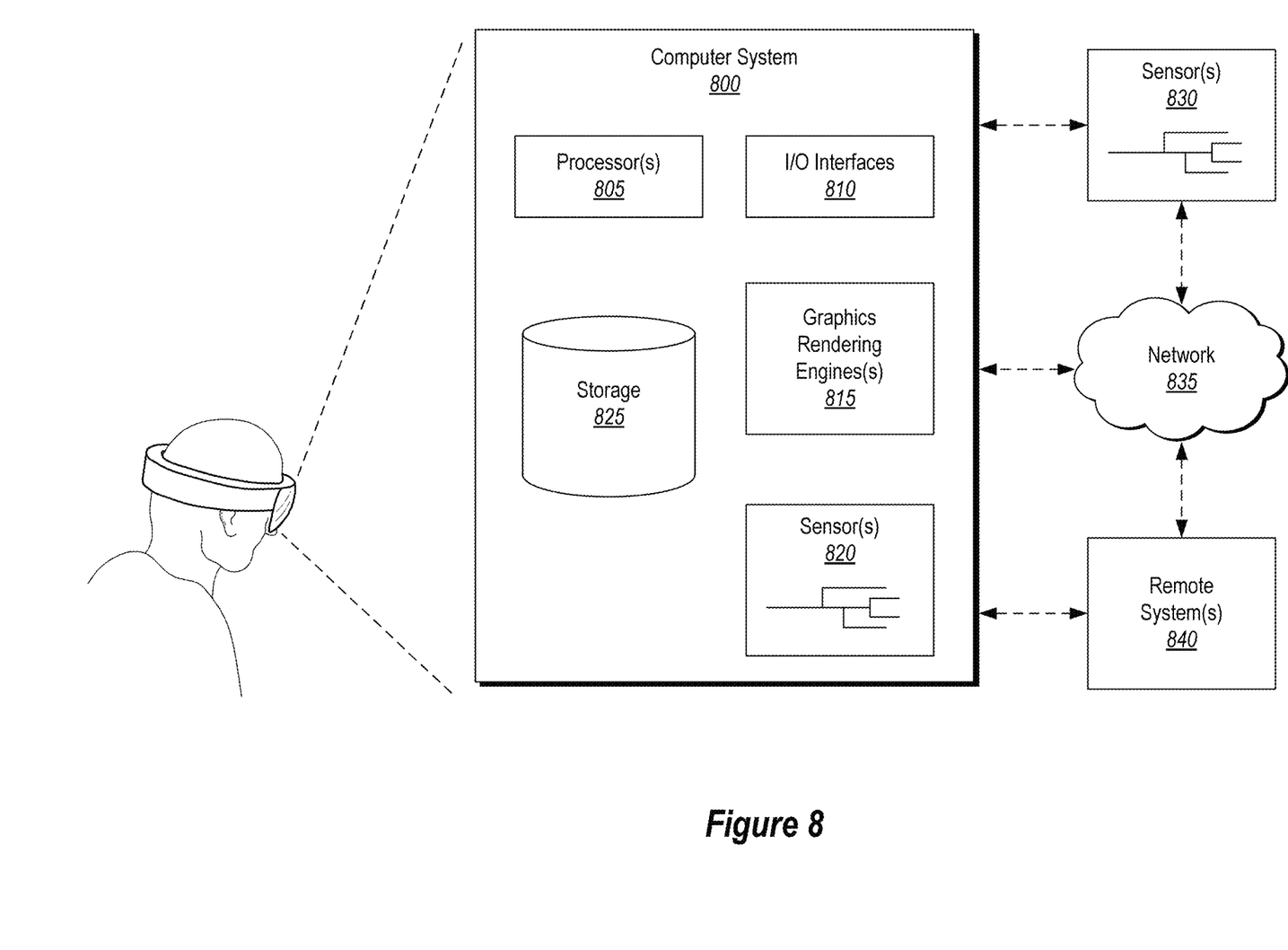
FIG. 8 illustrates an exemplary computer system that may include or comprise at least a portion of the disclosed and claimed embodiments.

Having just described the various features and functionalities of some of the disclosed embodiments, attention is now directed to FIG. 8, which illustrates an example computer system 800 that may be used to facilitate the operations described herein.

The computer system 800 may take various different forms. For example, in FIG. 8, the computer system 800 is embodied as a head-mounted display (HMD). Although the computer system 800 may be embodied as a HMD, the computer system 800 may also be a distributed system that includes one or more connected computing components/devices that are in communication with the HMD. Accordingly, the computer system 800 may be embodied in any form and is not limited strictly to the depiction illustrated in FIG. 8. By way of example, the computer system 800 may include a projector, desktop computer, a laptop, a tablet, a mobile phone, server, data center and/or any other computer system.

In its most basic configuration, the computer system 800 includes various different components. For example, FIG. 8 shows that computer system 800 includes at least one hardware processing unit 805 (aka a "processor"), input/output (I/O) interfaces 810, graphics rendering engines 815, one or more sensors 820, and storage 825. More detail on the hardware processing unit 805 will be presented momentarily.

The storage 825 may be physical system memory, which may be volatile, non-volatile, or some combination of the two. The term "memory" may also be used herein to refer to non-volatile mass storage such as physical storage media. If the computer system 800 is distributed, the processing, memory, and/or storage capability may be distributed as well. As used herein, the term "executable module," "executable component," or even "component" can refer to software objects, routines, or methods that may be executed on the computer system 800. The different components, modules, engines, and services described herein may be implemented as objects or processors that execute on the computer system 800 (e.g. as separate threads).

The disclosed embodiments may comprise or utilize a special-purpose or general-purpose computer including computer hardware, such as, for example, one or more processors (such the hardware processing unit 805) and system memory (such as storage 825), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 800 may also be connected (via a wired or wireless connection) to external sensors 830 (e.g., one or more remote cameras, accelerometers, gyroscopes, acoustic sensors, magnetometers, etc.). It will be appreciated that the external sensors include sensor systems (e.g., a sensor system including a light emitter and camera), rather than solely individual sensor apparatuses. Further, the computer system 800 may also be connected through one or more wired or wireless networks 835 to remote systems(s) 840 that are configured to perform any of the processing described with regard to computer system 800.

During use, a user of the computer system 800 is able to perceive information (e.g., a mixed-reality environment) through a display screen that is included among the I/O interface(s) 810 and that is visible to the user. The I/O interface(s) 810 and sensors 820/830 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

The graphics rendering engine 815 is configured, with the hardware processing unit 805, to render one or more virtual objects within the scene. As a result, the virtual objects accurately move in response to a movement of the user and/or in response to user input as the user interacts within the virtual scene.

A "network," like the network 835 shown in FIG. 8, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 800 will include one or more communication channels that are used to communicate with the network 835. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components (e.g., the hardware processing unit 805). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for controlling a position of an interactive movable menu in a mixed-reality environment, the system comprising:

one or more processors; and one or more computer-readable media having stored thereon computer-executable instructions that are operable, when executed by the one or more processors, to cause the system to:

present a mixed-reality environment to a user with a mixed-reality display device, the mixed-reality environment including one or more holograms;

detect a first controller gesture associated with a user controller while presenting the mixed-reality environment;

in response to the first controller gesture, trigger a display of an interactive movable menu within the mixed-reality environment to the user;

display the interactive movable menu within the mixed-reality environment as a tethered hologram that is dynamically moved within the mixed-reality environment relative to and corresponding with movement of the user controller within the mixed-reality environment, wherein when the interactive movable menu is tethered to the user controller, an ability of the user controller to directly interact with the interactive movable menu is limited;

during the display of the interactive movable menu, detect a second controller gesture in the mixed-reality environment which is at least partially performed with the user controller; and in response to the second controller gesture, selectively lock the interactive movable menu at a fixed position that is not tethered to the user controller, such that the interactive movable menu no longer moves within the mixed-reality environment as a tethered hologram that dynamically moves relative to and corresponding with movement of the user controller within the mixed-reality environment, and such that the user controller is able to interact with the locked display of the interactive movable menu in an unlimited manner.

2. The system of claim 1, wherein the interactive movable menu becomes locked with respect to a body position of the user in the mixed-reality environment such that the interactive movable menu stays in the fixed position with respect to the body position of the user.

3. The system of claim 1, wherein the fixed position is a fixed position relative to a gaze of the user in the mixed-reality environment, such that the interactive movable menu stays in the fixed position relative to the gaze of the user and as the gaze of the user moves, so does the interactive movable menu.

4. The system of claim 1, wherein the fixed position is a fixed position relative to the mixed-reality environment such that the interactive movable menu stays in a same position within the mixed-reality environment irrespective of movement of the user controller or movement of body of the user within the mixed-reality environment.

5. The system of claim 1, wherein the computer-executable instructions are further operable to cause the system to, after selectively locking the display of the interactive movable menu at the fixed position, detect a third controller gesture adapted to provide user input in response to the user controller interacting with the interactive movable menu at the fixed position.

6. The system of claim 1, wherein the computer-executable instructions are further operable to cause the system to, after selectively locking the display of the interactive movable menu at the fixed position, detect a third controller gesture adapted to selectively unlock the display of the interactive movable menu at the fixed position and such that the interactive movable menu is again displayed as the tethered hologram that is dynamically moved within the mixed-reality environment relative to and corresponding with movement of the user controller within the mixed-reality environment.

7. The system of claim 6, wherein the first controller gesture, the second controller gesture, and the third controller gesture are all performed by the user controller which comprises a hand of the user.

8. The system of claim 6, wherein the second controller gesture includes rotation of an orientation of the user controller to exceed a predetermined threshold.

9. A method for controlling a position of an interactive movable menu in a mixed-reality environment, the method comprising:
presenting a mixed-reality environment to a user with a mixed-reality display device, the mixed-reality environment including one or more holograms;
detecting a first controller gesture associated with a user controller while presenting the mixed-reality environment;
in response to the first controller gesture, triggering a display of an interactive movable menu within the mixed-reality environment to the user;
displaying the interactive movable menu within the mixed-reality environment as a tethered hologram that is dynamically moved within the mixed-reality environment relative to and corresponding with movement of the user controller within the mixed-reality environment, wherein when the interactive movable menu is tethered to the user controller, an ability of the user controller to directly interact with the interactive movable menu is limited;
during the display of the interactive movable menu, detect a second controller gesture in the mixed-reality environment which is at least partially performed with the user controller; and
in response to the second controller gesture, selectively locking the display of the interactive movable menu at a fixed position that is not tethered to the user controller and such that it no longer moves within the mixed-reality environment as a tethered hologram that dynamically moves relative to and corresponding with movement of the user controller within the mixed-reality environment, and such that the user controller is able to interact with the locked display of the interactive movable menu in an unlimited manner.

10. The method of claim 9, wherein the interactive movable menu becomes locked with respect to a body position of the user in the mixed-reality environment such that the interactive movable menu stays in the fixed position with respect to the body position of the user.

11. The method of claim 9, wherein the fixed position is a fixed position relative to a gaze of the user in the mixed-reality environment, such that the interactive movable menu stays in the fixed position relative to the gaze of the user and as the gaze of the user moves, so does the interactive movable menu.

12. The method of claim 9, wherein the fixed position is a fixed position relative to the mixed-reality environment such that the interactive movable menu stays in a same position within the mixed-reality environment irrespective of movement of the user controller or movement of a body of the user within the mixed-reality environment.

13. The method of claim 9, further comprising: after selectively locking the display of the interactive movable menu at the fixed position, detecting a third controller gesture adapted to provide user input in response to the user controller interacting with the interactive movable menu at the fixed position.

14. The method of claim 9, further comprising: after selectively locking the display of the interactive movable menu at the fixed position, detecting a third controller gesture adapted to selectively unlock the display of the interactive movable menu at the fixed position and such that the interactive movable menu is again displayed as the tethered hologram that is dynamically moved within the mixed-reality environment relative to and corresponding with movement of the user controller within the mixed-reality environment.

15. The method of claim 14, wherein the first controller gesture, the second controller gesture, and the third controller gesture are all performed by the user controller which comprises a hand of the user.

16. The method of claim 14, wherein the second controller gesture includes rotation of an orientation of the user controller to exceed a predetermined threshold.

17. One or more hardware storage devices having stored thereon computer-executable instructions, the computer-executable instructions being executable by one or more processors of a computer system to cause the computer system to:
present a mixed-reality environment to a user with a mixed-reality display device, the mixed-reality environment including one or more holograms;
detect a first controller gesture associated with a user controller while presenting the mixed-reality environment;

in response to the first controller gesture, trigger a display of an interactive movable menu within the mixed-reality environment to the user;

display the interactive movable menu within the mixed-reality environment as a tethered hologram that is dynamically moved within the mixed-reality environment relative to and corresponding with movement of the user controller within the mixed-reality environment, wherein when the interactive movable menu is tethered to the user controller, an ability of the user controller to directly interact with the interactive movable menu is limited;

during the display of the interactive movable menu, detect a second controller gesture in the mixed-reality environment which is at least partially performed with the user controller; and in response to the second controller gesture, selectively lock the display of the interactive movable menu at a fixed position that is not tethered to the user controller and such that it no longer moves within the mixed-reality environment as a tethered hologram that dynamically moves relative to and corresponding with movement of the user controller within the mixed-reality environment, and such that the user controller is able to interact with the locked display of the interactive movable menu in an unlimited manner.

18. The one or more hardware storage devices of claim 17, wherein the interactive movable menu becomes locked with respect to:

a body position of the user in the mixed-reality environment, such that the interactive movable menu stays in the fixed position with respect to the body position of the user;

a gaze of the user in the mixed-reality environment, such that the interactive movable menu stays in the fixed position relative to the gaze of the user and as the gaze of the user moves, so does the interactive movable menu; or a fixed position relative to the mixed-reality environment such that the interactive movable menu stays in a same position within the mixed-reality environment irrespective of movement of the user controller or movement of a body of the user within the mixed-reality environment.

19. The one or more hardware storage devices of claim 17, wherein the computer-executable instructions are executable to further cause the computer system to, after selectively locking the display of the interactive movable menu at the fixed position, detect a third controller gesture adapted to provide user input in response to the user controller interacting with the interactive movable menu at the fixed position.

20. The one or more hardware storage devices of claim 17, wherein the computer-executable instructions are executable to further cause the computer system to, after selectively locking the display of the interactive movable menu at the fixed position, detect a third controller gesture adapted to selectively unlock the display of the interactive movable menu at the fixed position and such that the interactive movable menu is again displayed as the tethered hologram that is dynamically moved within the mixed-reality environment relative to and corresponding with movement of the user controller within the mixed-reality environment.

* * * * *